United States Patent

Hall

[11] Patent Number: 6,154,308
[45] Date of Patent: Nov. 28, 2000

[54] TWO STEP DISCRETE PHASE SHIFT DEMODULATION METHOD FOR FIBER OPTIC SENSOR ARRAYS

[75] Inventor: David B. Hall, La Crescenta, Calif.

[73] Assignee: Litton Systems, Inc., Woodland Hills, Calif.

[21] Appl. No.: 09/364,145

[22] Filed: Jul. 30, 1998

[51] Int. Cl.[7] .................................................. G02F 2/00
[52] U.S. Cl. .......................................................... 359/325
[58] Field of Search .............................. 359/325; 356/345

[56] References Cited

U.S. PATENT DOCUMENTS

| | | | |
|---|---|---|---|
| 4,957,362 | 9/1990 | Peterson | 359/325 X |
| 5,633,748 | 5/1997 | Perez et al. | 359/325 |
| 5,719,673 | 2/1998 | Dorsel et al. | 356/345 |
| 5,883,548 | 3/1999 | Assard et al. | 359/325 X |

*Primary Examiner*—John D. Lee
*Attorney, Agent, or Firm*—Lynn & Lynn

[57] ABSTRACT

Optical signals input to a sensor array that includes a plurality of pathlength mismatched interferometers are phase modulated. Two different phase steps are generated in sequence within a time interval T in signals output from the interferometer array. Signals output from the array are processed to produce a first output signal $S_1$ that is a function of the phase shift $\phi$ and a first one of the phase steps in a first portion of the time interval T and a second output signal $S_2$ that is a function of the phase shift $\phi$ and the other one of the phase steps in a second portion of the time interval T. The signals $S_1$ and $S_2$, are processed to calculate the phase shift $\phi$ in optical signals that have propagated through the sensor array as functions of the sum and differences of the signals $S_1$ and $S_2$.

5 Claims, 1 Drawing Sheet

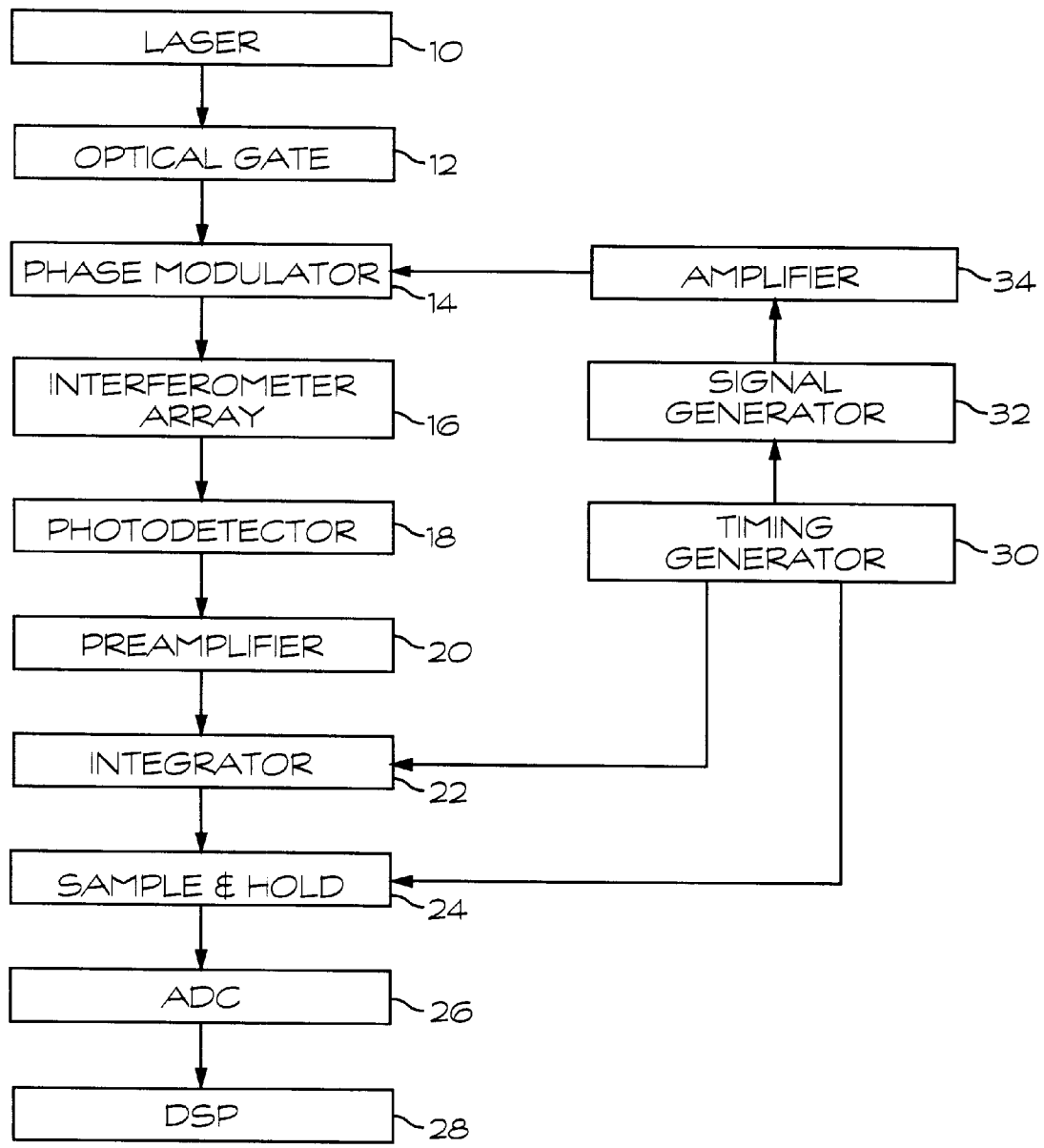

TWO STEP DISCRETE PHASE SHIFT DEMODULATION METHOD FOR FIBER OPTIC SENSOR ARRAYS

BACKGROUND OF THE INVENTION

This invention relates generally to signal processing techniques for fiber optic sensor systems. This invention relates particularly to demodulation of signals output from an array of fiber optic interferometric sensors for determining changes in a physical parameter measured by the individual sensors.

Mismatched fiber optic interferometers are commonly used as sensing elements in fiber optic sensor arrays for measuring changes in a parameter such as fluid pressure, acceleration, magnetic field intensity, etc. Such sensing elements measure the time-varying phase delay between two optical paths having unequal path length. Typically, a modulated optical signal is input to the sensor array, and various demodulation techniques have been proposed for correlating signals output from the array with the sensors that produced the signals.

Common to all demodulation methods for fiber optic interferometric sensor arrays is the acquisition of an in-phase (I) term proportional to the cosine of the interferometer phase shift and a quadrature term (Q) proportional to the sine of the interferometer phase shift. The angle of the phase shift is determined by calculating the ratio Q/I, which is the tangent of the sensor phase shift. The amplitudes of the sine and cosine terms must be set equal by a normalization procedure to ensure the successful implementation of an arctangent routine to find the sensor phase shift.

SUMMARY OF THE INVENTION

The present invention provides an improved method for demodulating signals output from a sensor array that includes a plurality of pathlength mismatched interferometers to determine phase shifts in optical signals that have propagated through the interferometers. The demodulation method of the invention, comprises the steps of:

(a) providing an optical signal;
(b) modulating the phase of the optical signal;
(c) inputting the modulated optical signal to the sensor array;
(d) controlling the ramp voltage to generate two different phase steps in sequence within a time interval T in signals output from the interferometer;
(e) producing a first output signal $S_1$ that is a function of the phase shift $\phi$ and a first one of the phase steps in a first portion of the time interval T;
(f) producing a second output signal $S_2$ that is a function of the phase shift $\phi$ and the other one of the phase steps in a second portion of the time interval T; and
(g) processing the signals $S_1$ and $S_2$, to calculate the phase shift $\phi$ as functions of the sum and differences of the signals $S_1$ and $S_2$.

The two phase steps preferably are +45° and −45°.

An appreciation of the objectives of the present invention and a more complete understanding of its structure and method of operation may be had by studying the following description of the preferred embodiment and by referring to the accompanying drawings.

BRIEF DESCRIPTION OF THE DRAWING

The FIGURE is a block diagram of an interferometric sensor array system with which the demodulation method according to the present invention may be used.

DETAILED DESCRIPTION OF THE INVENTION

The sensing element for a fiber optic sensor array is a mismatched fiber optic interferometer that measures the time varying phase delay between two paths. The well-known Mach-Zehnder and Michelson interferometer configurations (not shown) typically are used in such arrays. The output signal level of the interferometer measured at the optical receiver is given by $$S = A + B \cos \phi. \tag{1}$$

The average signal level is A, the interference signal level is B, and the desired interferometer phase shift is $\phi$. All three terms are time varying. The phase shift $\phi$ is proportional to the optical frequency of the laser source.

$$\phi = 2\pi f_0 \tau \tag{2}$$

The optical frequency is $f_0$ and the time varying optical delay time between the two paths is $\tau$. The quantity to be measured whether it be pressure, acceleration, magnetic field or anything else is expressed in terms of delay time $\tau$. Therefore, for a constant optical frequency $f_0$, the quantity to be measured can be expressed in terms of phase shift $\phi$. This phase shift associated with optical frequency $f_0$ is called the baseline phase shift.

Variations in $f_0$ and $\tau$ produce changes in $\phi$ in accordance with the following expression:

$$\phi + \Delta\phi = 2\pi f_0 \tau + 2\pi \Delta f \tau + 2\pi f_0 \Delta\tau. \tag{3}$$

The variation in $f_0$ can be produced either directly or indirectly. The direct approach entails a step change in laser source frequency either by modulation of the laser cavity length or by controlled mode hopping. The indirect approach requires the use of the external phase modulator 14. A step change in optical frequency at the output of the phase modulator is produced by means of a linear optical phase ramp over time impressed upon the phase modulator 14.

Extraction of the baseline optical phase shift $\phi$ is obtained by modulation of the optical frequency at rates greatly in excess of the rate of change of the delay time $\tau$. A sizeable step change in $\Delta\phi$ ($\pi/2$ radians for example) must be produced in a period sufficiently short so that the last term on the right hand side of Eq. (3) is negligible. In this case, the step change is given by $$\Delta\phi = 2\Delta\pi f \tau \tag{4}$$

In this way, multiple readings of the output signal level following step changes in optical frequency are obtained using Eq. (1). All of the readings take place within a time period T in which delay time $\tau$ and hence baseline phase shift $\phi$ do not change. Also, within this short time span, A and B do not change.

As shown in the FIGURE, a laser 10 supplies an optical signal of fixed frequency $\omega$ through an optical gate 12 to a phase modulator 14. The phase modulated optical signals are input to an interferometer array 16, which provides signals indicative of the interference output by each interferometric sensor in the array to a photodetector 18.

The photodetector 18 produces electrical signals corresponding to the interference outputs. The photodetector output is input to a preamplifier 20 before being input to an integrator 22. The integrated signal is sampled by a sample and hold circuit 24, which provides the sampled signals to an analog to digital converter 26. The digitized signals are then input to a digital signal processor 28 which performs calculations necessary to determine the phase shift $\phi$.

A timing generator 30 provides timing signals to a ramp voltage generator 32, which is used to drive the phase modulator 14. The output of the ramp voltage generator 32 is amplified by an amplifier 34, which provides the amplified ramp voltage signal to the phase modulator 14.

The timing generator 30 also provides timing signals to the integrator 22 and to the sample and hold circuit 24.

The digital signal processor 28 calculates the sine and cosine of the phase angle $\phi$ for each sensor in the array.

By changing the slope of the ramp voltage, signals of different frequency may be input to the interferometric sensor array 16. In this invention the ramp voltage is controlled to generate two different interferometer phase shifts in sequence within a time T. In this care the measured signal levels output from the interferometric sensor array may be written as:

$$S_1 = A + B \cos(\phi - \alpha) \tag{5}$$

and $$S_2 = A + B \cos(\phi - \alpha). \tag{6}$$

Signals $S_1$ and $S_2$ are shown with equal and opposite phase steps $\alpha$, which is determined by the ramp voltage. There is nothing intrinsic about this choice of equal and opposite phase steps; it is done to simplify the explanation of the method of the present invention. Sums and differences of the two signals are $$Q = S_1 - S_2 = 2B \sin \alpha \sin \phi \tag{7}$$

and $$D = S_1 + S_2 = 2A + 2B \cos \alpha \cos \phi. \tag{8}$$

Dividing Eq. (7) by Eq. (8), yields the following result:

$$\tan\varphi = \left\{\frac{Q}{(D-2A)}\right\}\cot\alpha. \tag{9}$$

The phase shift $\phi$ is a function of the signal difference Q, the signal sum D, and the two background quantities 2A and cot $\alpha$. The background quantities 2A and cot $\alpha$ are measured by observing Q and I for a time sufficient for the interferometer phase $\phi$ to go through a number of cycles of $2\pi$. The background quantities 2A and cot $\alpha$ are relatively stable. They vary very slowly and need to be updated at a rate that is a very small fraction of the data sampling rate.

Measured maximum and minimum values of Q and D observed over a number of cycles approach the following values:

$$Q_{max} = 2B \sin \alpha, \tag{10}$$

$$Q_{min} = -2B \sin \alpha, \tag{11}$$

$$D_{max} = 2A + 2B \cos \alpha, \tag{12}$$

and $$D_{min} = 2A - 2B \cos \alpha. \tag{13}$$

Equations (10)–(13) yield $$2A = \frac{1}{2}(D_{max} - D_{min}) \tag{14}$$

and $$\cot \alpha = (D_{max} - D_{min})/(Q_{max} - Q_{min}). \tag{15}$$

Substitution of Eqs. (14) and (15) into Eq. (9) yields $$\tan\varphi = \left(\frac{Q}{Q_{max} - Q_{min}}\right)\left[\frac{D_{max} - D_{min}}{D - \frac{1}{2}(D_{max} + D_{min})}\right]. \tag{16}$$

Taking the arctangent of Eq. (16) and keeping track of the number of cycles of $2\pi$, the phase shift $\phi$ is continuously tracked over time.

Eqs. (7), (8), and (9) are rewritten for the special case of $\alpha = \pi/4$ radians (or 45°).

$$Q = \sqrt{2} \, B \sin \phi \tag{17}$$

$$I = D - 2A = \sqrt{2} \, B \cos\varphi \tag{18}$$

$$\tan\varphi = \frac{Q}{I}. \tag{19}$$

In this case, the quadrature and in phase terms are of equal amplitude. This indicates that for preferred operation the phase step $\alpha$ should be in the vicinity of 45°.

The structures and methods disclosed herein illustrate the principles of the present invention. The invention may be embodied in other specific forms without departing from its spirit or essential characteristics. The described embodiments are to be considered in all respects as exemplary and illustrative rather than restrictive. Therefore, the appended claims rather than the foregoing description define the scope of the invention. All modifications to the embodiments described herein that come within the meaning and range of equivalence of the claims are embraced within the scope of the invention.

What is claimed is:

1. A method for demodulating signals output from a sensor array that includes a plurality of pathlength mismatched interferometers to determine phase shifts in optical signals that have propagated through the interferometers, comprising the steps of:

providing an optical signal;

modulating the phase of the optical signal;

inputting the modulated optical signal to the sensor array;

controlling the ramp voltage to generate two different phase steps in sequence within a time interval T in signals output from the interferometer;

producing a first output signal $S_1$ that is a function of the phase shift $\phi$ and a first one of the phase steps in a first portion of the time interval T;

producing a second output signal $S_2$ that is a function of the phase shift $\phi$ and the other one of the phase steps in a second portion of the time interval T; and processing the signals $S_1$ and $S_2$, to calculate the phase shift $\phi$ as functions of the sum and differences of the signals $S_1$ and $S_2$.

2. The method of claim 1 wherein the two phase steps have equal magnitudes and opposite directions.

3. The method of claim 2 wherein the two phase steps have magnitudes of 45°.

4. A method for demodulating signals output from a sensor array that includes a plurality of pathlength mismatched interferometers to determine phase shifts in optical signals that have propagated through the interferometers, comprising the steps of:

providing an optical signal;

modulating the phase of the optical signal;

inputting the modulated optical signal to the sensor array;

generating two different phase steps ±α in sequence within a time interval T in signals output from the interferometer;

producing a first output signal $S_1 = A + B \cos(\phi - \alpha)$ that is a function of the phase shift φ and a first one of the phase steps in a first portion of the time interval T;

producing a second output signal $S_2 = A + B \cos(\phi + \alpha)$ that is a function of the phase shift φ and the other one of the phase steps −α in a second portion of the time interval T;

processing the signals $S_1$ and $S_2$, to calculate the phase shift φ as functions of the sum and differences of the signals $S_1$ and $S_2$ by a process that includes the steps of:
defining a term $Q = S_1 - S_2 = 2B \sin\alpha \sin\phi$;
defining a term $D = S_1 + S_2 = 2A + 2B \cos\alpha \cos\phi$;
dividing the term Q by the term D to obtain $$\tan\varphi = \left\{\frac{Q}{(D-2A)}\right\}\cot\alpha;$$

measuring maximum and minimum values of the terms Q and D over a plurality of cycles to obtain $Q_{max} = 2B \sin\alpha$, $Q_{min} = -2B \sin\alpha$, $D_{max} = 2A + 2B \cos\alpha$ and $D_{min} = 2A - 2B \cos\alpha$;

calculating a value of the term $$2A = \frac{1}{2}(D_{max} - D_{min});$$

calculating a value of the term $$\cot\alpha = \frac{(D_{max} - D_{min})}{(Q_{max} - Q_{min})}; \text{ and}$$

determining the phase angle φ by determining the arctangent of $$\tan\varphi = \left(\frac{Q}{Q_{max} - Q_{min}}\right)\left[\frac{D_{max} - D_{min}}{D - \frac{1}{2}(D_{max} + D_{min})}\right].$$

5. The method of claim 4 wherein the two phase steps ±α have magnitudes of ±45° so that $Q = \sqrt{2} B \sin\phi$; $I = D - 2A = \sqrt{2} B \cos\phi$ and $\tan\phi = Q/I$.

* * * * *